(12) United States Patent
Kawashima et al.

(10) Patent No.: US 9,292,925 B2
(45) Date of Patent: Mar. 22, 2016

(54) IMAGING SYSTEM AND CONTROL METHOD THEREOF

(75) Inventors: Miyoko Kawashima, Haga-gun (JP); Tomochika Murakami, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 491 days.

(21) Appl. No.: 13/473,172

(22) Filed: May 16, 2012

(65) Prior Publication Data

US 2012/0307047 A1 Dec. 6, 2012

(30) Foreign Application Priority Data

Jun. 1, 2011 (JP) .................................. 2011-123496
Apr. 17, 2012 (JP) .................................. 2012-093805

(51) Int. Cl.
*H04N 7/18* (2006.01)
*G06T 7/00* (2006.01)
*G06T 3/40* (2006.01)
*G02B 21/36* (2006.01)

(52) U.S. Cl.
CPC ............. *G06T 7/0042* (2013.01); *G06T 3/4038* (2013.01); *G02B 21/367* (2013.01); *G06T 2207/10056* (2013.01)

(58) Field of Classification Search
CPC ................ G06T 7/0042; G06T 3/4038; G06T 2207/10056; G06T 7/004; G02B 21/367; G01B 11/00; G01B 21/00; G01B 13/00
USPC ........................................................ 348/135
See application file for complete search history.

(56) References Cited

U.S. PATENT DOCUMENTS

| 5,469,850 | A  | * | 11/1995 | Iizuka et al. ............... 600/443 |
|-----------|----|---|---------|--------------------------------------|
| 6,101,265 | A  | * | 8/2000  | Bacus et al. ............... 382/133  |
| 6,215,892 | B1 | * | 4/2001  | Douglass et al. ........... 382/128   |
| 6,226,392 | B1 | * | 5/2001  | Bacus et al. ............... 382/128  |
| 6,546,123 | B1 | * | 4/2003  | McLaren et al. ........... 382/128    |
| 6,553,135 | B1 | * | 4/2003  | Douglass et al. ........... 382/128   |
| 6,661,918 | B1 | * | 12/2003 | Gordon et al. ............. 382/173   |
| 7,359,548 | B2 | * | 4/2008  | Douglass et al. ........... 382/162   |
| 7,428,325 | B2 | * | 9/2008  | Douglass et al. ........... 382/128   |
| 7,743,348 | B2 | * | 6/2010  | Robbins et al. ............ 715/863   |
| 7,929,738 | B2 |   | 4/2011  | Shirota et al. ............. 382/128  |

(Continued)

FOREIGN PATENT DOCUMENTS

| JP | A 6-011341 | 1/1994 |
|----|------------|--------|
| JP | A 9-138355 | 5/1997 |

(Continued)

*Primary Examiner* — Shan Elahi
(74) *Attorney, Agent, or Firm* — Fitzpatrick, Cella, Harper & Scinto

(57) ABSTRACT

An imaging system includes: an imaging unit that divides an imaging area of a subject into a plurality of blocks and captures images of the blocks; an image processing unit that merges the images of the respective blocks captured by the imaging unit to generate an entire image; a measuring unit that measures a plurality of points on the subject to acquire measured data before an image of the subject is captured by the imaging unit; and a dividing position adjusting unit that adjusts dividing positions of the subject based on the measured data of the measuring points acquired by the measuring unit so that boundaries of the blocks are arranged at positions having smaller spatial variations in values of the measured data. The imaging unit captures an image of each block according to the dividing positions adjusted by the dividing position adjusting unit.

21 Claims, 8 Drawing Sheets

(56) References Cited

U.S. PATENT DOCUMENTS

| | | | |
|---|---|---|---|
| 8,396,269 B2* | 3/2013 | Henderson et al. | 382/128 |
| 2001/0050999 A1* | 12/2001 | Bacus et al. | 382/128 |
| 2002/0061127 A1* | 5/2002 | Bacus et al. | 382/128 |
| 2003/0021490 A1* | 1/2003 | Okamoto et al. | 382/284 |
| 2003/0228038 A1* | 12/2003 | Douglass et al. | 382/128 |
| 2003/0231791 A1* | 12/2003 | Torre-Bueno et al. | 382/133 |
| 2004/0009098 A1* | 1/2004 | Torre-Bueno | 422/63 |
| 2004/0066960 A1* | 4/2004 | McLaren et al. | 382/128 |
| 2004/0085443 A1* | 5/2004 | Kallioniemi et al. | 348/135 |
| 2004/0105000 A1* | 6/2004 | Yuri | 348/79 |
| 2004/0136581 A1* | 7/2004 | Ellis et al. | 382/128 |
| 2005/0037406 A1* | 2/2005 | De La Torre-Bueno et al. | 435/6 |
| 2005/0051466 A1* | 3/2005 | Carter et al. | 210/94 |
| 2005/0185832 A1* | 8/2005 | Douglass et al. | 382/133 |
| 2005/0232483 A1* | 10/2005 | Kato et al. | 382/171 |
| 2006/0103735 A1* | 5/2006 | Yang et al. | 348/218.1 |
| 2006/0178833 A1* | 8/2006 | Bauer et al. | 702/19 |
| 2007/0081231 A1* | 4/2007 | Shirota et al. | 359/380 |
| 2007/0126892 A1* | 6/2007 | Guan | 348/240.99 |
| 2007/0153095 A1* | 7/2007 | Cheung et al. | 348/231.99 |
| 2009/0041351 A1* | 2/2009 | Kato et al. | 382/171 |
| 2009/0060303 A1* | 3/2009 | Douglass et al. | 382/128 |
| 2009/0086314 A1* | 4/2009 | Namba et al. | 359/383 |
| 2010/0007727 A1* | 1/2010 | Torre-Bueno | 348/79 |
| 2010/0013948 A1* | 1/2010 | Azuma et al. | 348/222.1 |
| 2010/0073510 A1* | 3/2010 | Nemoto | 348/223.1 |
| 2010/0135547 A1* | 6/2010 | Lee et al. | 382/128 |
| 2011/0007178 A1* | 1/2011 | Kahlman | 348/222.1 |
| 2011/0075928 A1* | 3/2011 | Jeong et al. | 382/181 |
| 2011/0261218 A1* | 10/2011 | Oike et al. | 348/222.1 |
| 2012/0092546 A1* | 4/2012 | Borovytsky | 348/345 |

FOREIGN PATENT DOCUMENTS

| | | |
|---|---|---|
| JP | A 9-281405 | 10/1997 |
| JP | A 11-249021 | 9/1999 |
| JP | A 2000-295462 | 10/2000 |
| JP | A 2004-191959 | 7/2004 |
| JP | A 2005-98833 | 4/2005 |
| JP | A 2007-121837 | 5/2007 |

* cited by examiner

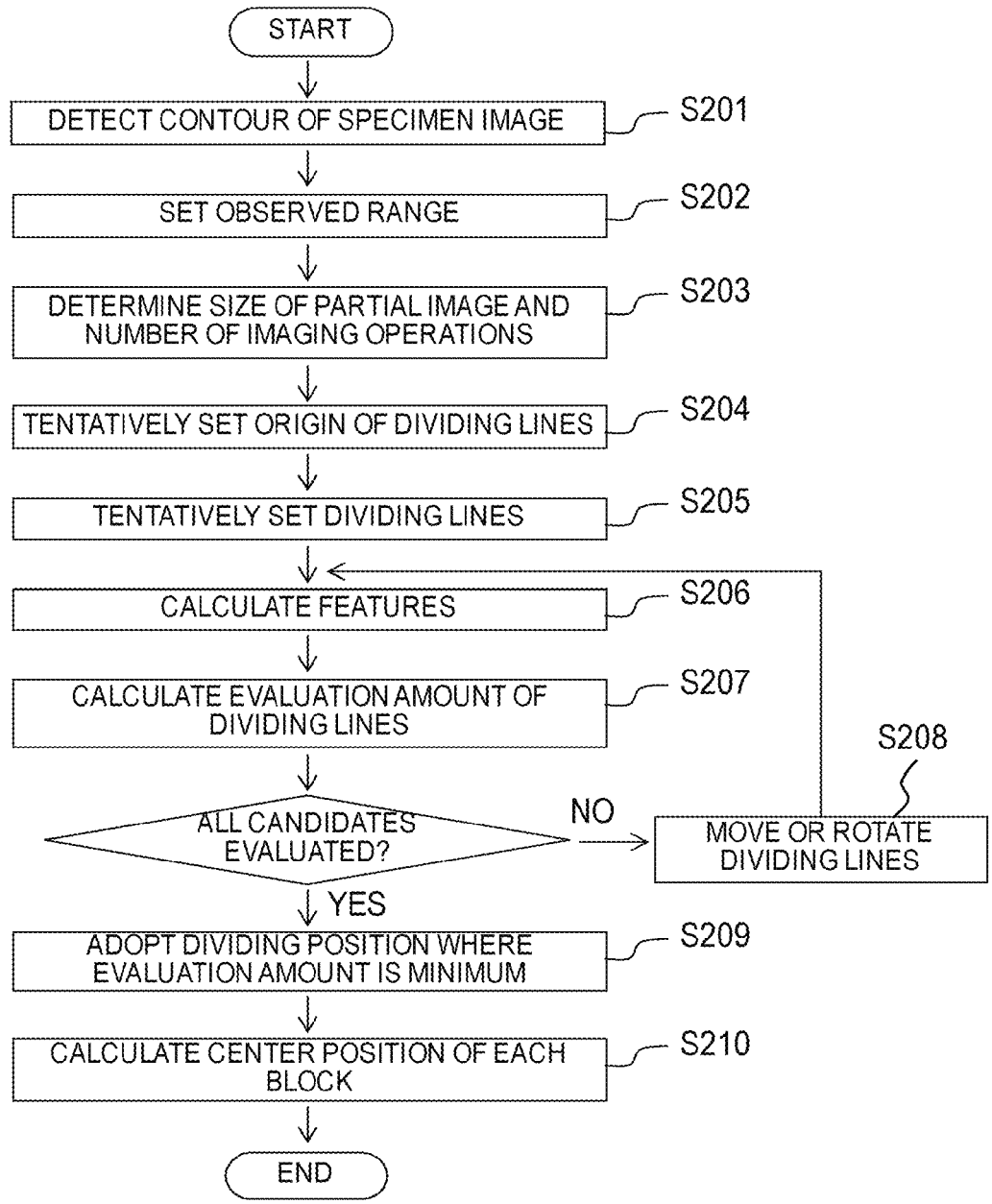

- IMAGING DEVICE 305
- IMAGING AREA
- IMAGE SENSOR

- IMAGING DEVICE 305
- IMAGING AREA
- CENTER POSITION
- ROTATION ANGLE θ
- IMAGE SENSOR (LIGHT-RECEIVING AREA)

IMAGING SYSTEM AND CONTROL METHOD THEREOF

BACKGROUND OF THE INVENTION

1. Field of the Invention

The present invention relates to an imaging system that captures an image of a subject and acquires digital image data, and to a control method of the imaging system.

2. Description of the Related Art

In the field of pathological diagnosis, imaging systems that capture a microscope image of a subject specimen (a tissue slice or the like of a human body) to acquire, store, and view a high-definition digital image are recently gaining prominence. An imaging system of this type is also referred to as a virtual slide system.

Japanese Patent Application Laid-Open No. H09-281405 proposes a system that enables wide-field observation by piecing together a plurality of images of different imaging blocks in order to generate a high-resolution, wide angle-of-view image. In this system, after an operator first specifies an imaging area on a low-resolution entire image, an image processing apparatus divides the imaging area into blocks, captures a high-magnification image of each block using a microscope, and pieces image data of the respective blocks together to generate a single image. In addition, Japanese Patent Application Laid-Open No. 2000-295462 discloses automatically detecting a range (a top-left coordinate and a bottom-right coordinate) in which a specimen image exists among an entire image based on brightness information, and dividing the detected range into blocks and capturing a high-magnification image of each block using a microscope. As described above, watching a specimen position or a range to be observed on a slide glass before acquiring a high-resolution image has been conventionally performed.

However, conventional systems simply divide a specified (designated) or detected imaging area in a mechanical manner based on a size that can be acquired by one imaging operation.

Therefore, there may be cases where a portion in which an image changes abruptly such as a contour or an irregularity of a specimen image overlaps with a boundary between blocks. In such a case, since features (brightness, color, contrast, or the like) of the image varies significantly at a joint between images of blocks, an image merging process may become complicated or difficult or a required processing time may increase. There is also a risk that many of the joints of images may become discontinuous.

SUMMARY OF THE INVENTION

In consideration thereof, an object of the present invention is to provide a technique that enables a high-quality entire image with only a few discontinuous joints to be generated by a simple process using an imaging system that acquires a wide angle-of-view entire image by merging a plurality of separately captured partial images.

The present invention in its first aspect provides an imaging system having an imaging unit that divides an imaging area of a subject into a plurality of blocks and captures images of the blocks, and an image processing unit that merges the images of the respective blocks captured by the imaging unit to generate an entire image, the imaging system including: a measuring unit that measures a plurality of points on the subject to acquire measured data before an image of the subject is captured by the imaging unit; and a dividing position adjusting unit that adjusts dividing positions of the subject based on the measured data of the measuring points acquired by the measuring unit so that boundaries of the blocks are arranged at positions having smaller spatial variations in values of the measured data, wherein the imaging unit captures an image of each block according to the dividing positions adjusted by the dividing position adjusting unit.

The present invention in its second aspect provides a control method of an imaging system having an imaging unit that divides an imaging area of a subject into a plurality of blocks and captures images of the blocks, and an image processing unit that merges the images of the respective blocks captured by the imaging unit to generate an entire image, the control method including the steps of: measuring a plurality of points on the subject to acquire measured data before an image of the subject is captured by the imaging unit; adjusting dividing positions of the subject based on the measured data of the measuring points acquired in the measuring step so that boundaries of the blocks are arranged at positions having smaller spatial variations in values of the measured data; and capturing, by the imaging unit, an image of each block according to the dividing positions adjusted in the dividing position adjusting step.

According to the present invention, a high-quality entire image with only a few discontinuous joints can be generated by a simple process using an imaging system that acquires a wide angle-of-view entire image by merging a plurality of separately captured partial images.

Further features of the present invention will become apparent from the following description of exemplary embodiments with reference to the attached drawings.

BRIEF DESCRIPTION OF THE DRAWINGS

FIG. 3 is a flow chart showing a flow of a dividing position adjusting process;

DESCRIPTION OF THE EMBODIMENTS

Hereinafter, embodiments of the present invention will be described with reference to the accompanying drawings.
(System Configuration)

Figure 1:
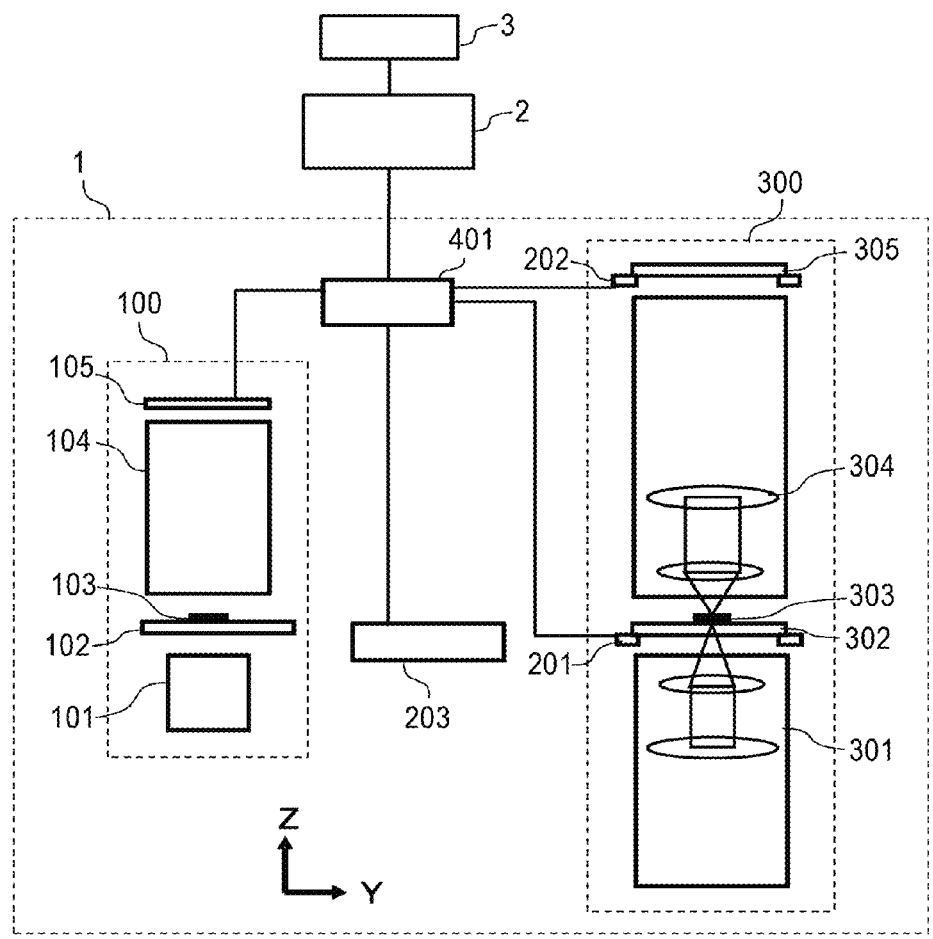
FIG. 1 is a diagram showing a schematic configuration of an imaging system.

FIG. 1 is a diagram showing a configuration example of an imaging system according to the present invention. As shown in FIG. 1, an imaging system roughly comprises an imaging apparatus 1, an image processing apparatus 2, and a display apparatus 3.

The imaging apparatus 1 is an apparatus that captures an image of a specimen on a slide which is a subject and generates a digital image, and comprises a measuring unit 100 that performs measurement, an imaging unit 300 that performs high-magnification imaging, a conveyor 203 that conveys the slide, and a controller (control unit) 401.

The slide comprises a specimen (a tissue slice or the like), which is a subject, placed on a slide glass, wherein the specimen is sandwiched and fixed by a transparent protective member (cover glass). For example, when an image of a 10 mm by 10 mm-observed area on the slide is captured at an optical magnification of 10×, an imaging area on an imaging plane has a size of 100 mm by 100 mm or, in other words, a size with a diameter of approximately 141 mm. A large-size image pickup device (image sensor) capable of collectively capturing such an area is affected by a yield loss due to pixel defects and the like and leads to increased cost. In consideration thereof, in the present imaging system, an imaging area is divided into a plurality of blocks, imaging is performed on each block, and obtained partial images are merged (connected) to generate an entire image. Specifically, based on measured data of an entire specimen obtained through measurement, imaging conditions such as an actual imaging area and block dividing positions are determined, and the imaging unit 300 captures an image of each block according to the imaging conditions.

The image processing apparatus 2 is equipped with a function that applies predetermined image processing (developing, color conversion, gamma correction, noise reduction, compression, or the like) to image data obtained from the imaging apparatus 1, a function that merges images of blocks, a function that manages and views images, and the like. The image processing apparatus 2 may be constituted by a general-purpose computer comprising a CPU, a memory, a storage device, an input device, and the like, or a dedicated image processing circuit may be provided. A program for realizing the functions described above is stored in a storage device of the image processing apparatus 2. The display apparatus 3 is a display used to view images, analysis results, and the like. Moreover, system configurations are not limited to this example. For instance, functions of the image processing apparatus 2 may be built into the imaging apparatus 1, or the display apparatus 3 may be integrated with the imaging apparatus 1 or the image processing apparatus 2.

The measuring unit 100 of the imaging apparatus 1 comprises a measurement lighting device 101, a measurement stage 102, a measuring optical system 104, and a measuring device 105.

The measurement lighting device 101 includes a lighting optical system that guides light from a light source to a slide 103 placed on the measurement stage 102. The measurement stage 102 holds the slide 103 and adjusts a position of the slide 103 with respect to the measuring optical system 104.

The measuring optical system 104 is an optical system that guides light transmitted through the slide 103 to the measuring device 105. Since the measuring unit 100 is intended to measure the entire slide, a low-magnification measuring optical system 104 may be used.

The measuring device 105 is a sensor that measures a physical quantity at a plurality of points on a subject based on light from the measuring optical system 104. If the purpose is to measure a distribution of brightness or color of a specimen image, for example, an image sensor such as a CCD (Charge Coupled Device) or a CMOS (Complementary Metal Oxide Semiconductor) may be used. If the purpose is to measure an irregularity (surface profile) of a specimen or a cover glass, various distance sensors that utilize reflected light or interfering light may be used. For example, an optical distance measurement method based on triangulation such as that disclosed in Japanese Patent Application Laid-Open No. H6-011341 or a method of measuring a difference in distances of laser light reflected off of a glass boundary surface using a confocal optical system such as that disclosed in Japanese Patent Application Laid-Open No. 2005-98833 may be adopted. Moreover, while a transmission measuring unit is exemplified in FIG. 1, depending on a physical quantity to be measured or on a sensor type, a reflective measuring unit that irradiates light from a cover glass side and measures light reflected off of a subject may be used, or a combination of a plurality of units or sensors may be used.

Measured data of each measuring point is transmitted to the controller 401 and is utilized to detect a size of a specimen on the slide 103 or an existence range (contour) of the specimen, to detect a brightness or color of a specimen image, to measure a surface profile (irregularities) of the specimen or the cover glass, or the like. As shown in FIG. 1, when a direction parallel to an optical axis of the measuring optical system 104 (an imaging optical system 304) is assumed to be a z direction and a direction perpendicular to a plane of paper is assumed to be an x direction, data is created for a brightness of a specimen image or the like as quantities at respective x and y positions. In addition, data is created for a surface profile as z positions of surfaces at respective x and y positions.

The conveyor 203 conveys the slide 103 on which a measurement has been finished from the measuring unit 100 to the imaging unit 300. Reference numeral 303 denotes a slide arranged on an imaging stage 302 of the imaging unit 300. As for a specific mechanism of the conveyor 203, for example, a mechanism in which the measurement stage 102 itself moves and functions as the imaging stage 302 may be adopted, or a mechanism in which the slide is gripped or adsorbed by a hand apparatus and moved onto the stage may be adopted. Alternatively, different slides may be respectively placed on the measurement stage 102 and the imaging stage 302, and a measuring process and an imaging process may be performed in parallel. Moreover, when consecutively performing imaging of a plurality of slides, slides housed in a stocker (not shown) are conveyed one by one by the conveyor 203 to the measurement stage 102 and then to the imaging stage 302.

Based on a result of an analysis of the measured data, the controller 401 determines relative positions and directions (rotation angles in an xy plane) of the slide (an image of the slide) and an imaging device 305 when capturing an image of the slide 303. The controller 401 transmits information on the determined positions and directions to a drive unit 201 and drives the imaging stage 302 so that the slide 303 is set to a desired position. Alternatively, the controller 401 can drive a drive unit 202 to rotate the imaging device 305 or to move the imaging device 305 in a direction of the optical axis.

The drive unit 201 is a mechanism that drives the imaging stage 302 based on a signal transmitted from the controller 401 and adjusts relative positions of the slide 303 and the imaging device 305. The drive unit 201 mainly moves the stage 302 in x and y directions to finely adjust the position of the slide 303.

The drive unit 202 drives the imaging device 305 based on a signal transmitted from the controller 401. The drive unit 202 finely adjusts an imaging position by mainly rotating the imaging device 305 in an xy plane and moving the imaging device 305 in a z direction. The drive unit 202 may integrally drive the imaging optical system 304 and the imaging device 305. Alternatively, the drive unit 202 can be omitted by providing the imaging stage 302 with a mechanism that performs rotation in the xy plane or driving in the z direction.

The imaging unit 300 of the imaging apparatus 1 comprises an imaging lighting device 301, the imaging stage 302, the imaging optical system 304, and the imaging device 305.

The imaging lighting device 301 includes a lighting optical system that guides light from a light source to a slide 303 placed on the imaging stage 302. For example, a halogen lamp, a xenon lamp, or an LED (Light Emitting Diode) may be used as the light source.

The imaging optical system 304 is an optical system that enlarges an optical image of a specimen that is a subject and guides the enlarged optical image to the imaging device 305. Light transmitted through the slide 303 forms an image on an imaging plane on the imaging device 305 via the imaging optical system 304.

The imaging device 305 photoelectrically converts light received via the imaging optical system 304, and generates and outputs image data. The image data is transmitted to the image processing apparatus 2 via the controller 401. The imaging device 305 is constituted by an image sensor such as a CCD or a CMOS. A size, number, and arrangement of the image sensor are arbitrary. For example, images of N-number of blocks may be captured by a single image sensor over N-number of imaging operations or by a plurality (m-number) of image sensors over N/m-number of imaging operations. Using a plurality of image sensors advantageously reduces imaging time.

(Procedure of Image Acquisition)

Figure 2:
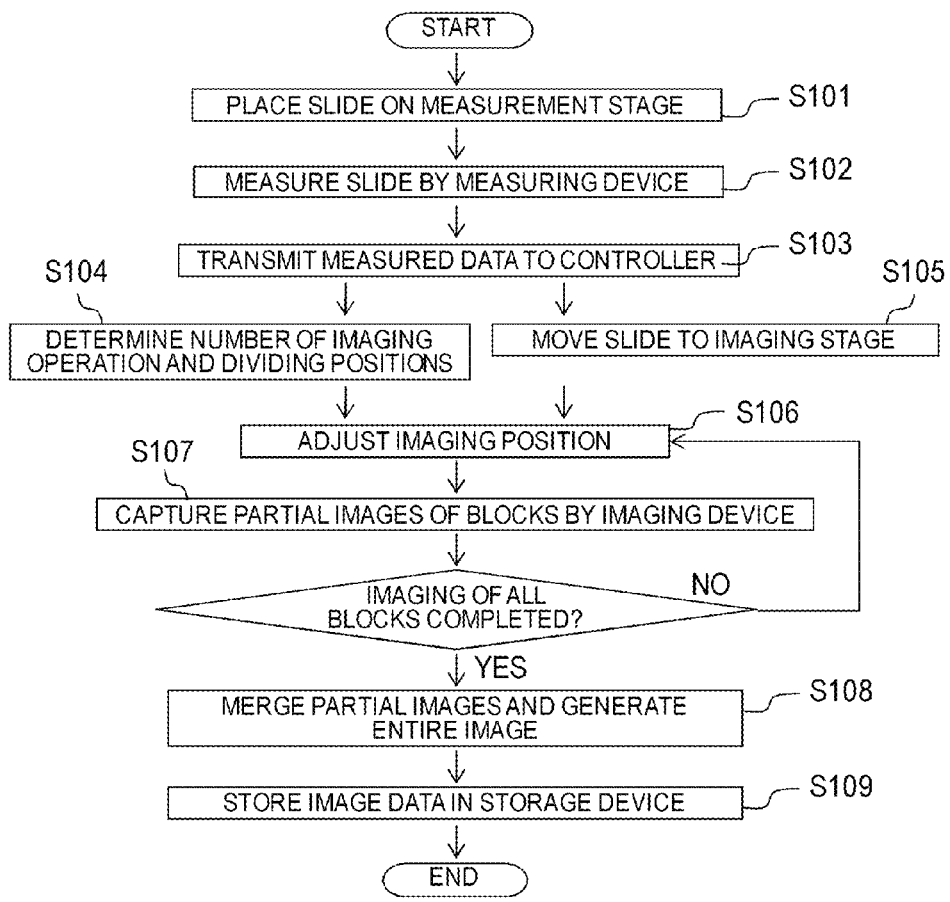
FIG. 2 is a flowchart showing a flow of a measuring process and an imaging process.

Next, a procedure of a measuring process and an imaging process will be described with reference to the flowchart shown in FIG. 2.

First, the controller 401 controls the conveyor 203 to place the slide 103 on the measurement stage 102 (S101). Moreover, the placement on the measurement stage 102 need not necessarily be performed automatically and may be performed by the operator himself/herself instead.

Subsequently, the measurement lighting device 101 illuminates the slide 103 placed on the measurement stage 102. The light from the measuring optical system 104 is received by the measuring device 105 and an intensity value and a height in an optical axis direction of the light are measured (S102). The measuring device 105 transmits the measured data to the controller 401 (S103).

Next, based on the measured data, the controller 401 calculates an imaging area of a specimen and how to divide the imaging area into blocks and determines the number of imaging operations (number of divisions) and dividing positions (relative positions of the slide and the imaging device 305 in each block). The information is instructed to the drive units 201 and 202 (S104). The process performed in S104 will be described in detail with reference to the flow chart shown in FIG. 3 and in the first and second embodiments.

While the controller 401 is performing the calculation of S104, the conveyor 203 conveys the slide from the measurement stage 102 to the imaging stage 302 (S105). In order to reduce processing time, the processes of S104 and S105 are performed in parallel.

Subsequently, in accordance with the information instructed in S104, the drive units 201 and 202 move and/or rotate the stage 302 and the imaging device 305 and adjust the relative positions of the slide and the imaging device 305 so as to assume an imaging position of a first block (S106).

Next, the imaging lighting device 301 illuminates the slide 303 placed on the imaging stage 302, and the imaging device 305 captures an optical image of a block enlarged at high magnification by the imaging optical system 304. The imaging device 305 transmits the partial image data of the block to the image processing apparatus 2 (S107).

Once imaging of one block is finished, the drive units 201 and 202 align the stage 302 and the imaging device 305 to an imaging position of a next block (S106), and the imaging device 305 obtains partial image data of the next block (S107). Operations of S106 and S107 are repeated for the number of imaging operations obtained in S104 and partial image data of a plurality of blocks is obtained.

Subsequently, the image processing apparatus 2 merges partial image data of all blocks and generates high-resolution, wide angle-of-view image data of the entire specimen (S108). The image processing apparatus 2 stores the image data in an internal or external storage device (S109). In addition, in response to an instruction from a user, the image processing apparatus 2 displays the image data on the display apparatus 3.

(Adjustment of Dividing Positions)

Next, a flow of a dividing position adjusting process performed in S104 will be described with reference to the flow chart shown in FIG. 3.

In S102 and S103 described earlier, physical quantities regarding the specimen such as light intensity (brightness, color) or a height of a surface of a cover glass or the specimen of each measuring point on the subject have been transmitted to the controller 401. Based on the measured data, a two-dimensional image representing a spatial intensity distribution (brightness distribution) of a specimen image or a spatial height distribution (surface profile) of the specimen can be generated. Hereinafter, this two-dimensional image will be referred to as a measured image.

First, the controller 401 extracts a contour of a specimen image from an intensity distribution (brightness distribution) of the measured image (S201), and sets an observed range so as to contain the specimen image (S202). When a plurality of observation objects (observation targets) exist on the slide, an observed range is set so as to contain all observation objects. A general contour detection method such as binarization can be used to detect the contour of the specimen image.

Next, the controller 401 determines a size of a partial image that is acquired by one imaging operation (a size of a block) and the number of imaging operations necessary for capturing the entire observed range set in S202 (S203). The partial image size is set to a value smaller than a size of an image that the image sensor of the imaging device 305 can acquire by one imaging operation (a capturable image size). The partial image size may be provided in advance, determined by the controller 401 according to a magnification of the imaging optical system 304, or specified by the user. In addition, the controller 401 may set a value calculated by subtracting an overlapping portion (joint) of images necessary when merging the images from the capturable image size as the partial image size.

Next, the controller 401 tentatively sets an origin of dividing lines at an arbitrary position within the measured image (S204), and tentatively sets an imaging area and dividing lines thereof with reference to the origin (S205). An imaging area is an entire range in which high-resolution imaging is to be performed by the imaging unit 300 and must be set to as to at least contain the observed range set in S202. Dividing lines are virtual lines that divide the entire imaging area into blocks having the size set in S203, and correspond to boundaries of a partial image that is a unit of imaging adopted by the imaging unit 300.

Next, the controller 401 calculates a feature (amount of characteristic) that represents a degree of spatial variation of the physical quantities (brightness, color, height, or the like) for each measuring point on the dividing lines (S206). Alternatively, a physical quantity of a vicinity of the dividing lines or a physical quantity within the boundaries may be used to calculate the feature. A value obtained by performing a differential operation on the measured image such as a second-order differential value (a Laplacian or the like) can be used as a feature.

The controller 401 calculates a summation of features of measuring points on the dividing lines as an evaluation amount (S207). At this point, features of points within an area having a predetermined width (for example, a few pixels) centered on each dividing line are favorably used to calculate an evaluation amount. The evaluation amount can be described as an indicator that indicates a magnitude of a variation in values of measured data on a boundary between blocks.

Subsequently, the controller 401 alters the relative positions of the dividing lines and the specimen by translating the origin of the dividing lines or rotating the dividing lines around the origin of the dividing lines in a plane perpendicular to the optical axis (S208). An evaluation amount is obtained for the altered dividing lines in a similar manner to that described above (S207). A range or an amount of movement (amount of rotation) in which the dividing lines are moved (rotated) is determined in advance, and the controller 401 repeats S207 and S208 until evaluation amounts are obtained for dividing lines of all candidate positions. Moreover, in addition to translation and rotation, methods of altering the relative positions of the dividing lines and the specimen include scaling of the dividing lines. Any one of these methods may be used solely or a plurality of methods may be combined.

The controller 401 then determines positions at which the evaluation amount is minimum or, in other words, positions at which a variation in physical quantity in the vicinity of the dividing lines is minimum as dividing positions to be used in imaging (S209). The controller 401 calculates a center position of each block divided according to the dividing positions and stores a coordinate value thereof (S210). Alternatively, the controller 401 may store coordinates of the origin of the dividing lines and rotation angles. The process of S104 is hereby concluded.

Moreover, while a method has been adopted in the description above in which an evaluation amount is obtained for all candidate positions of the dividing lines and an evaluation amount minimum value is detected from the evaluation amounts, methods of minimum value search is not limited thereto. For example, after obtaining evaluation amounts at scattered positions within a range of movement of the origin of the dividing lines, the dividing lines may be finely moved around a position having a minimum value among the obtained evaluation amounts to search for a position having a minimum evaluation amount. Alternatively, a minimum value may be obtained by any minimum value search method that is usually used.

(Position Control of Stage and Imaging Device)

Position control of the stage and the imaging device when capturing an image of a block by the imaging unit 300 will now be described with reference to FIGS. 4A to 4C.

Figure 4C:
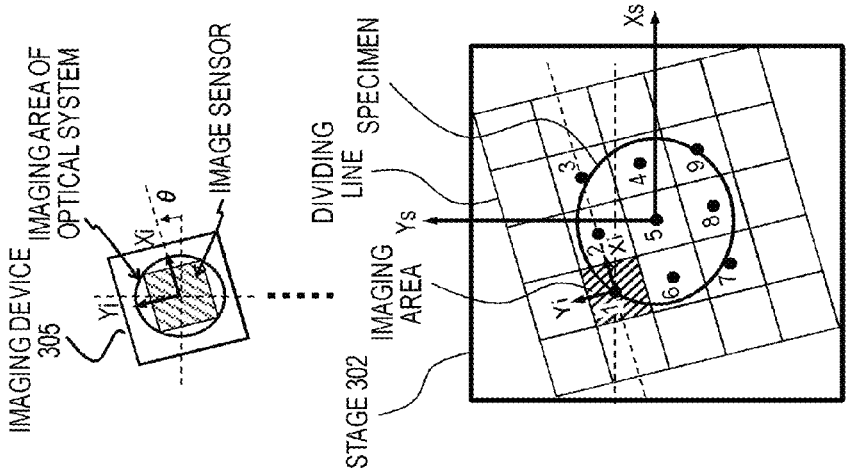
FIGS. 4A to 4C are diagrams illustrating position control of an imaging device and a stage.
Figure 4B:
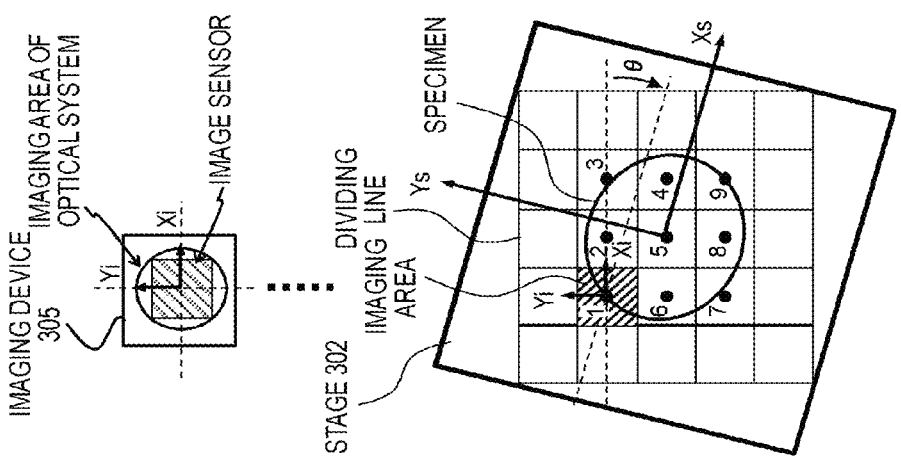
Figure 4A:
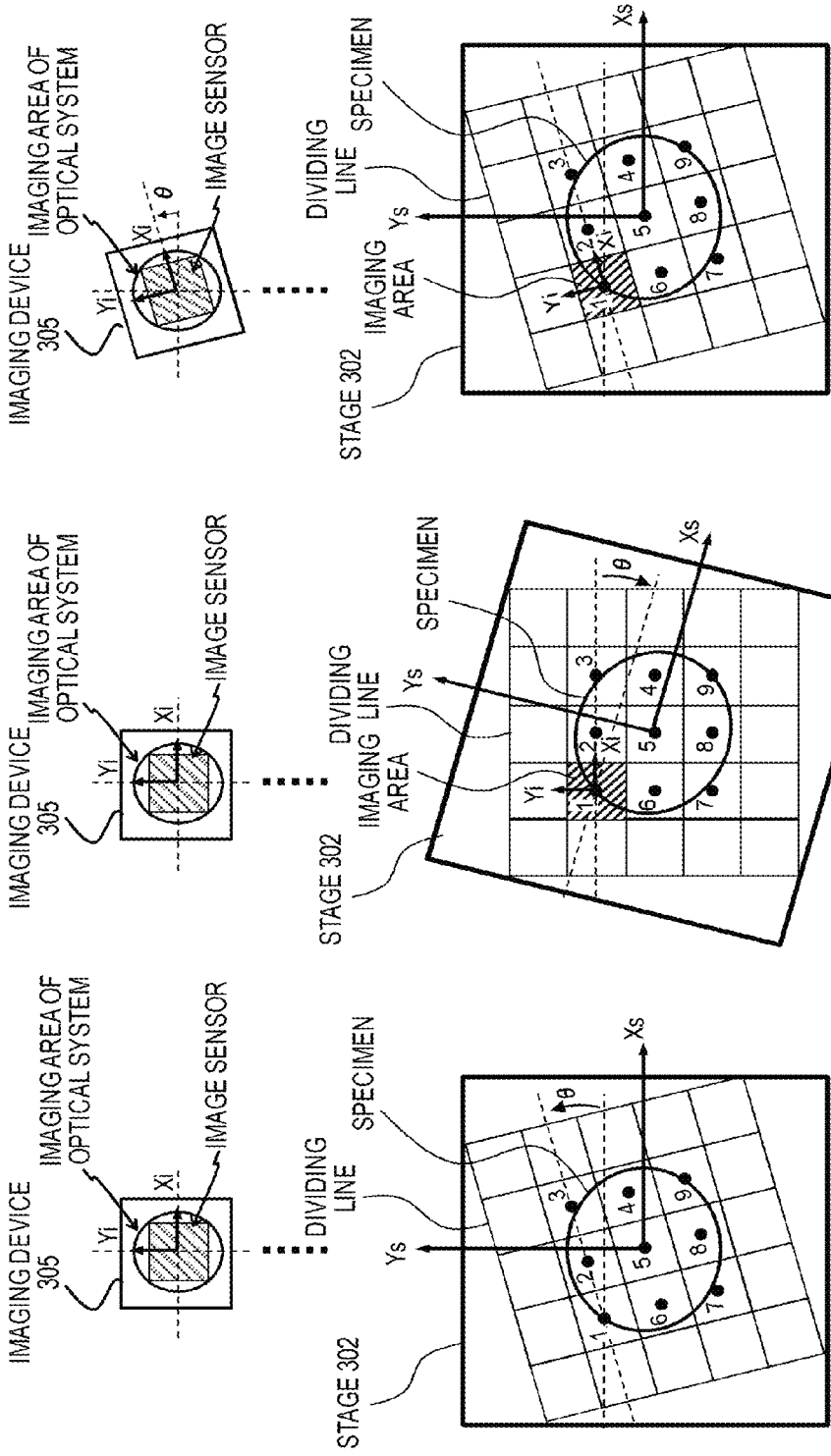

FIG. 4A shows an initial position relationship between the stage 302 and the imaging device 305 immediately after S104. A position on a plane of the stage 302 is expressed by a coordinate system (Xs, Ys). An origin of (Xs, Ys) is set at an arbitrary position of the stage 302. Although the imaging stage is, in reality, significantly larger than the specimen, the imaging stage is shown in a size similar to that of the specimen so as to fit into the diagram. In addition, shapes are not limited to that shown.

A position on a plane of the imaging device 305 is expressed by a coordinate system (Xi, Yi). An origin of (Xi, Yi) is set to a center of the image sensor and the imaging area.

A conversion between a length in the imaging device coordinate system (Xi, Yi) and a length in the stage coordinate system (Xs, Ys) can be performed using a magnification of the imaging optical system 304.

Now, let us assume that dividing positions have been determined as shown in FIG. 4A by the process performed in S104. Blocks 1 to 9 in FIG. 4A are areas on which high-resolution imaging is to be performed. The blocks respectively have center coordinates of (Xs1, Ys1), ..., (Xs9, Ys9) and are rotated by a rotation angle θ in the xy plane. Naturally, θ may be set as θ=0 in an initial state.

FIGS. 4B and 4C show position relationships between the stage 302 and the imaging device 305 after setting the slide to the imaging position in S106. In this case, the slide is set to a first imaging position (block 1). FIG. 4B shows the stage 302 rotated by −θ and translated by (−Xs1, −Ys1). The imaging device 305 is fixed in an XiYi plane. As a result, the block 1 is included in the imaging area of the imaging device 305. FIG. 4C shows the stage 302 translated by (−Xs1, −Ys1). The imaging device 305 is rotated by θ in the XiYi plane. As a result, the block 1 is included in the imaging area of the imaging device 305. Imaging may be performed using either of the methods shown in FIGS. 4B and 4C.

First Embodiment

In the first embodiment, a method of adjusting dividing positions based on an intensity distribution (brightness distribution) of a specimen image will be described in detail.

Figure 5C:
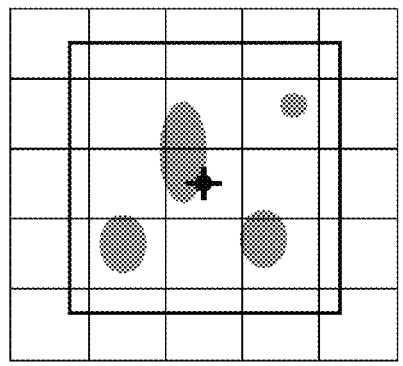
FIGS. 5A to 5F are diagrams showing a dividing position adjusting process based on a brightness distribution of a specimen image according to a first embodiment.
Figure 5F:
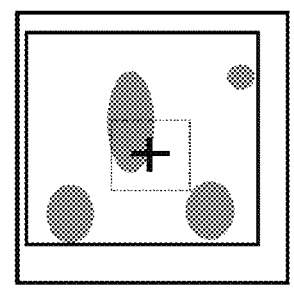
Figure 5B:
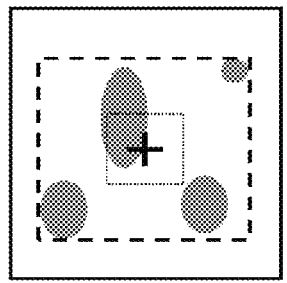
Figure 5E:
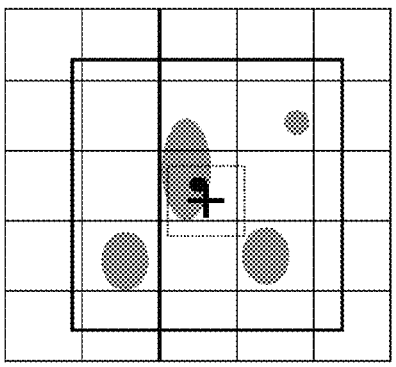
Figure 5A:
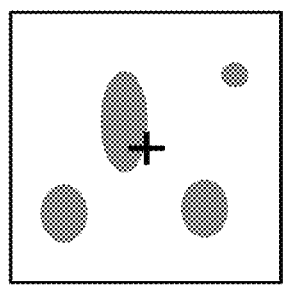

FIG. 5A shows an example of a measured image obtained by measurement. In the present embodiment, a low-resolution entire specimen image (where each pixel represents a brightness of each point of a specimen image) is used. In FIG. 5A, portions colored gray are specimen images and are observation objects. A white portion is a background portion of the specimen images. In this example, four observation objects exist on the slide.

In addition, an outer square in FIG. 5A represents the imaging stage 302, and a cross-shaped reference position represents a center position of the imaging stage 302. Although the imaging stage is, in reality, significantly larger than the specimen, the imaging stage is shown in a size similar to that of the specimen so as to fit into FIG. 5A. Moreover, the reference position may be set to an arbitrary position on the slide instead of the center position of the imaging stage 302.

A contour of the specimen image is detected in S201, and an observed range is set in S202 so as to contain all observation objects. A portion enclosed by a long dashed line in FIG. 5B is the observed range. The reference position indicated by the cross shape is relocated to a center of the observed range. In S203, a size of the blocks is determined. A dotted line in FIG. 5B represents a block (hereafter referred to as a reference block) arranged so that a center thereof coincides with the reference position.

Next, the controller 401 arranges a tentative origin of dividing lines at an arbitrary position within the reference block (S204), and tentatively sets an aggregate of blocks or, in other words, the dividing lines so as to cover the entire observed range (S205). FIG. 5C shows an example in which the tentative origin (represented by a dot) of the dividing lines is arranged on the reference position. In other words, the dividing lines are arranged so that a center position of the aggregate of blocks overlaps the reference position. In addition, the horizontal and vertical numbers of the blocks or, in other words, a size of the imaging area is determined so that at least one extra row of blocks is arranged around an outer periphery of the observed range. By setting the imaging area in this manner, the observed range can be prevented from deviating from the imaging area even if the dividing lines are translated or rotated.

Figure 5D:
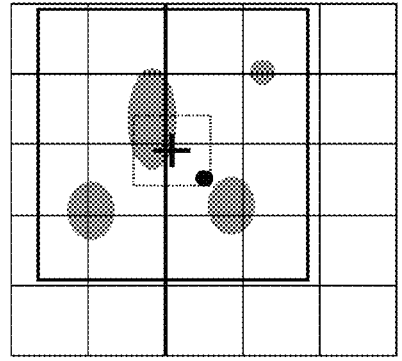

Subsequently, the controller 401 obtains a feature (a second-order differential value or the like) by performing a differential operation or the like on a physical quantity of each point of a measured image on the dividing lines (S206), and calculates an evaluation amount (S207). Furthermore, as shown in FIGS. 5D and 5E, while moving the origin position of the dividing lines within the reference block, a feature and an evaluation amount at each position are calculated (S208, S206, and S207). The origin of the dividing lines is movable within the reference block. A limited n-number of coordinate points are set within the reference block, and the origin position of the dividing lines is set on the n-number of coordinate points. In S208, a direction (rotation angle θ) of the dividing lines may also be varied. The rotation angle θ is similarly set as a limited m-number of directions. Since an alteration in the position or direction of the dividing lines causes a variation in the overlap of the dividing lines (boundaries between blocks) and the specimen image, a value of an evaluation amount also varies. Once the evaluation amounts of all candidates (for example, n×m-number of candidates) are calculated, the series of steps S206 to S208 is concluded. The calculated evaluation amounts (for example, n×m-number of evaluation amounts) are used to select an origin position and a rotation angle of the dividing lines corresponding to a minimum evaluation amount. Instead of selecting any of the n-number of coordinate points, an intermediate position between the n-number of coordinate points may be selected as the origin position of the dividing lines by imputing evaluation amount data. The same applies for the rotation angle of the dividing lines. Among FIGS. 5C to 5E, the evaluation amount is minimum at the origin position of the dividing lines shown in FIG. 5E which has the least overlap between the dividing lines and the specimen image boundaries, and the dividing lines shown in FIG. 5E are selected as the dividing lines that is used in imaging (S209). A center position of each block can be obtained from the origin position of the dividing lines (and the rotation angle of the dividing lines) (S210). Moreover, in the present embodiment, a movement/rotation of the dividing lines (S208), a calculation of a feature of each point of a measured image on the dividing lines (S206), and a calculation of an evaluation amount of the dividing lines (S207) are repetitively performed. Alternatively, all features of the respective points of a measured image in the observed range may be calculated in advance, and only a movement/rotation of the dividing lines (S208) and a calculation of an evaluation amount of the dividing lines (S207) may be repetitively performed.

FIG. 5F shows an entire image obtained by capturing a high-resolution image of each block according to the dividing positions shown in FIG. 5E and by merging the high-resolution images. When performing imaging, only an image of a portion in which the specimen exists among each area enclosed by the dividing lines may be captured. An interior of an inner square shown in FIG. 5F represents an example of a merged image obtained from nine partial images by capturing only portions in which the specimen exists.

A general method of merging an entire image involves extracting characteristic portions from an overlapping part between adjacent images, associating pixels between images by evaluating degrees of coincidence or degrees of similarity through a cross-correlation coefficient calculation or the like, and smoothly joining the adjacent images. However, when setting dividing positions at locations with a small brightness variation as is the case with the present embodiment, a characteristic portion is often undetectable from a part where images overlap each other. As a result, a favorable merge result may not be obtained. Therefore, in the present embodiment, instead of performing a process such as associating pixels between partial images, a method is adopted in which after performing misregistration correction or the like on each partial image, the corrected partial images are simply merged (pieced together).

For example, the image processing apparatus 2 individually performs correction of misregistration or the like on each partial image based on misregistration information regarding each block stored in advance. When there is dispersion in brightness or color in each block, brightness correction or color correction is favorably performed together with misregistration correction. Subsequently, the image processing apparatus 2 merges the corrected partial images. At this point, the image processing apparatus 2 generates an entire image by deleting overlapping parts between adjacent partial images (in other words, trimming each partial image down to the size of a block) and then tiling the partial images. Alternatively, the image processing apparatus 2 may merge the partial images by alpha blending pixels in the overlapping parts.

Conceivable misregistrations include a misregistration caused by an aberration (residual aberration, thermal aberration, or the like) of an imaging optical system of the imaging unit 300 or an optical system of the imaging lighting device 301, and a misregistration attributable to precision of mounting or positioning of the stage or the imaging device. As for the former, since the misregistration can be calculated from parameters of the optical system, the misregistration may be stored in advance in a storage device of the image processing apparatus 2. As for the latter, since each structure may have a different misregistration, an amount of misregistration may be acquired by a preliminary calibration and stored in the storage device of the image processing apparatus 2. An amount of misregistration may differ for different relative positions of the image sensor and the stage or, in other words, per block, and may also differ for each measuring point (pixel) within a block. Therefore, strictly speaking, information on an amount of misregistration for each point in each block is desirably stored. However, since this results in an enormous amount of data, favorably, only amounts of misregistration of representative points are stored or amounts of misregistration are stored in a function format, and the amount of misregistration (amount of correction) of each point is obtained through calculation.

According to the configuration of the present embodiment described above, since imaging conditions are determined so that a boundary of a block coincides with a position where a change in the image is small, the occurrence of unnatural or discontinuous joints of partial images can be reduced in comparison to conventional configurations. Therefore, a high-quality entire image can be generated even by a simple merging process involving simply piecing together partial images subjected to misregistration correction. In addition, since an observation object portion such as a contour of a specimen (a cell or the like) or a structurally characteristic site can be arranged not to overlap with a joint of partial images, information necessary for observation is less likely to be lost.

In the present embodiment, while a method of determining dividing positions based on an intensity distribution (brightness distribution) has been described, when a color image has been obtained as measured data, a method may be adopted in which dividing positions are determined based on a color distribution so that a boundary between blocks coincides with a position where a color difference between pixels is small. A color image may be obtained by a method combining a white light source and a color image sensor (for example, an image sensor with a Bayer arrangement), or by a method in which a captured image is merged using a light source of three colors of R (with a wavelength in a vicinity of 650 nm), G (with a wavelength in a vicinity of 550 nm), and B (with a wavelength in a vicinity of 450 nm), and a black and white image sensor. Obviously, even if a color image has been obtained as measured data, dividing positions may be determined from a spectroscopic brightness distribution. In addition, dividing positions may be obtained from a brightness distribution of a white image merged based on RGB values or from a brightness distribution of any of the channels among RGB.

Second Embodiment

In the second embodiment, a method of determining dividing positions based on a surface profile (height distribution) of a specimen or a cover glass will be described.

Figure 6A:
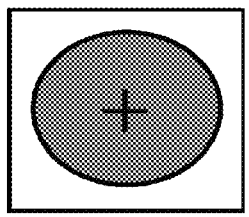
FIGS. 6A to 6F are diagrams showing a dividing position adjusting process based on a height distribution of a specimen according to a second embodiment.

FIG. 6A shows an example of a measured image obtained by measurement. In a similar manner to the first embodiment, a low-resolution entire specimen image (where each pixel represents a brightness of each point of a specimen image) is used for processes such as setting an observed range. In FIG. 6A, portions colored gray are specimen images and are observation objects. A white portion is a background portion of the specimen images. In this example, one observation object exists on the slide. A cross-shaped reference position in the diagram represents a center position of an imaging stage.

In addition, in a similar manner to the first embodiment, a controller 401 detects a contour of a specimen image, sets an observed range, sets a size of a block and sets a reference block, and then tentatively sets dividing lines (S201 to S205). At this point, if a contour cannot be readily detected or if an outline does not exist, an observation object may be arbitrarily set. The dividing lines are set so that an imaging area (the number of blocks) is one size larger than the observed range in order to prevent the imaging area from deviating from the observed range when the dividing lines are moved or rotated.

Figure 6B:
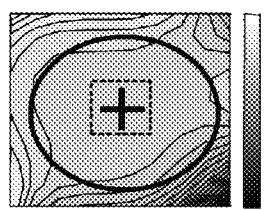

Next, the controller 401 determines dividing positions. As shown in FIG. 6B, in subsequent processes, a measured image representing a surface profile (height distribution) of the specimen is used. Each pixel of the image indicates a height in an optical axis direction at each point on a surface of the specimen. Moreover, in FIG. 6B, a heavy-line ellipse represents a contour of the specimen, a cross shape represents a reference position, and a dotted line depicts a reference block.

Figure 6C:
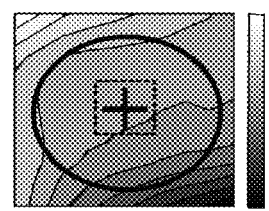
Figure 6D:
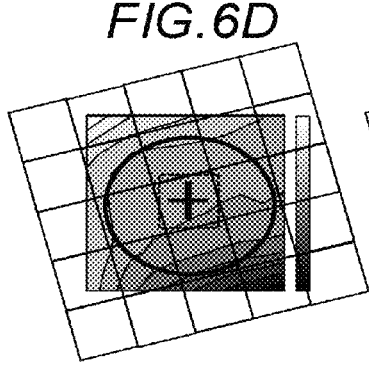
Figure 6E:
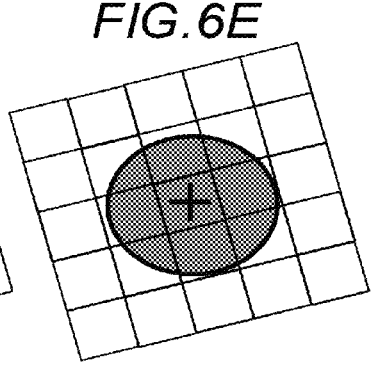
Figure 6F:
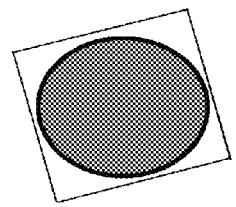

The controller 401 obtains a second-order differential value (Laplacian) of each point of the measured image representing the surface profile as a feature (S206). FIG. 6C shows a distribution of second-order differential values and an outline of a specimen image. In a similar manner to the first embodiment, while moving the origin position of the dividing lines within the reference block as shown in FIG. 6D, the controller 401 calculates an evaluation amount at each position (S207 and S208). Positions having a minimum evaluation amount are selected as dividing positions (S209). Subsequent processes are similar to those of the first embodiment.

Generally, a surface of a specimen is not flat and has irregularities (undulations). Since a depth of field of an imaging optical system used in imaging is extremely shallow, even a slight difference in the optical axis direction appears as a difference in contrast or blur of an image. Therefore, when there are dividing lines at a position with a large surface gradient (a position at which height varies significantly), a difference in image quality (contrast or blur) at a boundary between partial images increases and may make merging difficult.

In contrast, according to the method according to the present embodiment, since dividing lines are arranged so that a boundary between blocks coincides with a position at which a gradient of the specimen surface is small, the occurrence of unnatural or discontinuous joints of partial images can be reduced in comparison to conventional methods. Therefore, a high-quality entire image can be generated even by a simple merging process involving simply merging partial images subjected to misregistration correction.

Third Embodiment

In the present embodiment, a specific example of an imaging process by an imaging unit will be described.

Figure 7A:
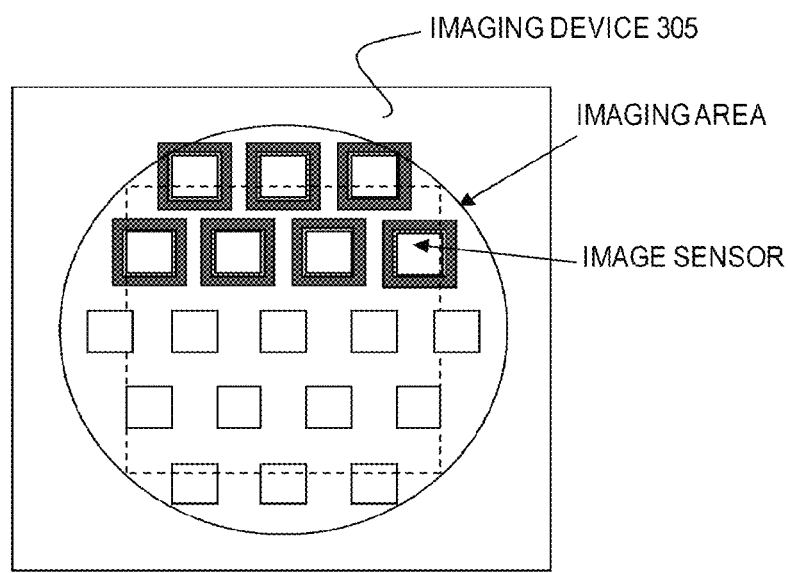
FIGS. 7A and 7B are diagrams showing a configuration of an imaging device according to a third embodiment.

FIG. 7A shows an example of a configuration of an imaging device 305. A circle in the diagram represents an imaging area of an imaging optical system 304. In the present embodiment, a high-resolution imaging optical system 304 having a central wavelength of 550 nm, a numerical aperture NA of 0.7, and a magnification of 10× is used. If a field of view on a slide has a size of 10 mm by 10 mm, an imaging area on an imaging plane of the imaging device 305 has a size of 100 mm by 100 mm or, in other words, a size with a diameter of approximately 141 mm. Since it is unrealistic to use an image sensor capable of collectively capturing such an area, the imaging device 305 according to the present embodiment adopts a construction in which a plurality of (in FIG. 7A, 19) image sensors are arranged.

Figure 7B:
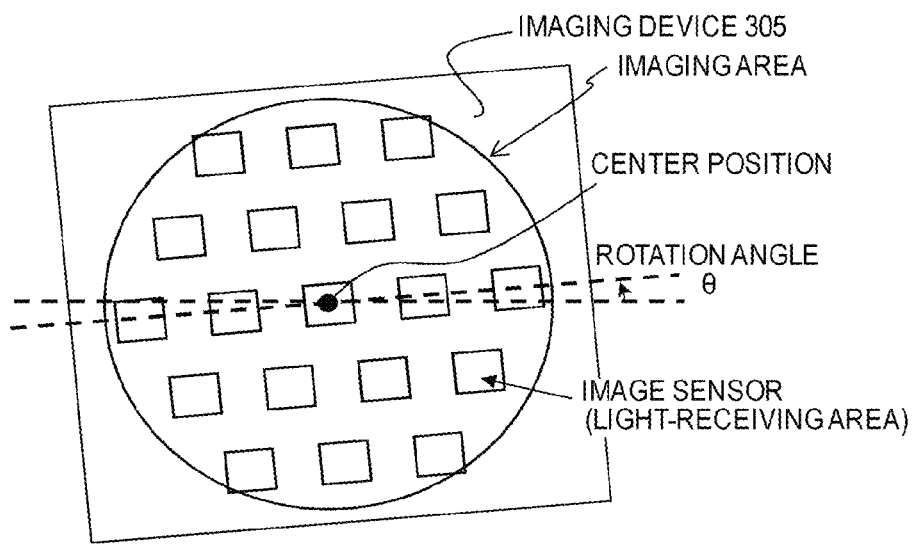

Since an image sensor has a circuit and a substrate in addition to a light-receiving area that actually senses light, the image sensor is one size larger than the light-receiving area. In upper two rows in FIG. 7A, a light-receiving area is represented by a white square and an insensible area around the light-receiving area is colored black. The insensible area is not shown in lower three rows of FIG. 7A. Due to the presence of such an insensible area, light-receiving areas of image sensors cannot be arranged without any space therebetween. Consequently, as shown in FIG. 7A, the respective image sensors are arranged separated from each other at a predetermined pitch. During imaging, in order to fill the gaps between the image sensors, imaging must be performed a plurality of times by moving one of or both of the slide and the imaging device 305. In the present embodiment, a method of moving the slide (the imaging stage 302) is adopted, and the imaging device 305 is only rotated as shown in FIG. 7B. Alternatively, the imaging stage 302 may be rotated instead of the imaging device 305.

Figures 8A, 8B:
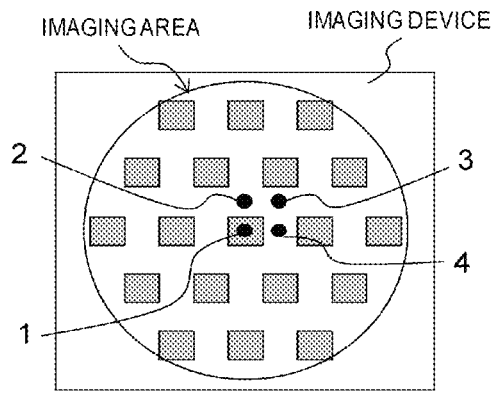
FIGS. 8A to 8D are diagrams showing an example of an imaging process according to the third embodiment.
Figures 8C, 8D:
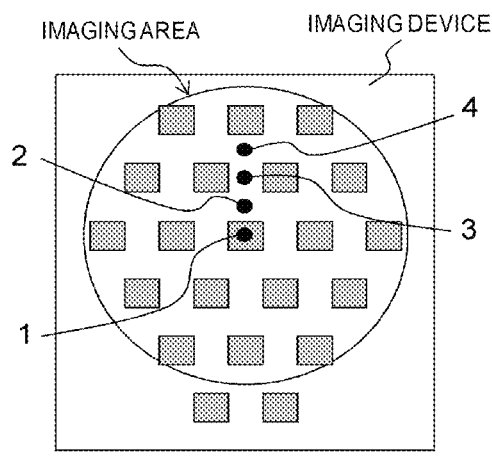

FIGS. 8A and 8C represent positions of an imaging area and the image sensors on an imaging plane. Grey squares represent light-receiving areas of image sensors or, in other words, areas of partial images that can be captured in one imaging operation. Moreover, an area that can be captured in one imaging operation is determined based on a size and number of the image sensors. FIGS. 8B and 8D show imaging positions on an imaging plane, wherein "1" denotes a first imaging position, "2" denotes a second imaging position, and so on.

By fixing a center position of the imaging device as shown in FIG. 8A and repetitively performing imaging by sequentially placing the reference position of the imaging stage at positions 1, 2, 3, and 4, partial images that fill up the entire imaging area can be acquired as shown in FIG. 8B. Alternatively, by repetitively performing imaging by sequentially placing the reference position of the imaging stage at positions 1, 2, 3, and 4 as shown in FIG. 8C, partial images that fill up the entire imaging area can be acquired as shown in FIG. 8D.

The image sensors may be arranged outside an optical field of view. This is because the field of view moves when relative positions of the slide and the relative position are altered and the image sensors enter the field of view. In this case, some image sensors that were inside the field of view until then may be forced out of the field of view.

Therefore, when using an imaging device configured in this manner, the controller 401 decides to perform four imaging operations and determines imaging positions (relative positions of the slide and the imaging device) for the four imaging operations. A position and direction of dividing lines are determined by the method described in the previous embodiments.

Moreover, while an imaging device having a plurality of image sensors is used in the present embodiment, a configuration may be adopted in which images of all blocks are captured by a step method in which an imaging device comprising a single image sensor is sequentially moved. In addition, after capturing images of a 10 mm by 10 mm area on the slide by four imaging operations as in the present embodiment, the stage or the imaging device may be moved to capture an image of another area on the slide. As a result, an image of an even wider angle of view can be acquired.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-123496, filed on Jun. 1, 2011, and Japanese Patent Application No. 2012-093805, filed on Apr. 17, 2012, which are hereby incorporated by reference herein in their entirety.

What is claimed is:

1. An imaging system comprising:
an imaging device that performs a plurality of imaging operations to capture images of a subject arranged on a slide, each imaging operation capturing a respective partial image of a respective corresponding block in an imaging area of the subject, and stores image data in a storage device;
an image processing device that merges the plurality of partial images to generate an entire image of the imaging area of the subject;
a measuring device that measures a plurality of positions on the subject to acquire measured data; and
a controller that sets boundaries between the blocks at positions to minimize spatial variations of the measured data out of the plurality of positions on the subject.

2. The imaging system according to claim 1, wherein
said measuring device acquires information on a brightness of the subject as at least part of the measured data, and
said controller sets the boundaries between the blocks at positions to minimize variations in brightness of the subject.

3. The imaging system according to claim 1, wherein
said measuring device acquires information on a color of the subject as at least part of the measured data, and
said controller sets the boundaries between the blocks at positions to minimize variations in color of the subject.

4. The imaging system according to claim 1, wherein
said measuring device acquires, as at least part of the measured data, information on a height of a surface of the subject in an optical axis direction or information on a height of a surface of a protective member in an optical axis direction provided over the subject, and
the dividing positions of the subject are adjusted such that said controller sets the boundaries between the blocks at positions to minimize variations in the height of the surface of the subject or the surface of the protective member.

5. The imaging system according to claim 1, wherein said controller adjusts the boundaries between the blocks by translating the boundaries between the blocks in a plane perpendicular to an optical axis.

6. The imaging system according to claim 1, wherein said controller adjusts the boundaries between the blocks by rotating the boundaries between the blocks in a plane perpendicular to an optical axis.

7. The imaging system according to claim 1, wherein said controller obtains an observed range in which the subject is present based on the measured data, and determines the imaging area so as to contain the observed range.

8. The imaging system according to claim 1, wherein said controller:
calculates a feature corresponding to variation of measured data for each of a plurality of points on the subject;
calculates an evaluation amount based on the features of the plurality of points located on or in a vicinity of the boundaries between the blocks;
calculates the evaluation amount at each position while varying positions of the boundaries between the blocks; and
sets the boundaries between the blocks at positions to minimize the evaluation amount.

9. The imaging system according to claim 8, wherein the feature is a second-order differential value.

10. The imaging system according to claim 1, wherein said image processing device generates the entire image by independently correcting the image of each block and then merging the corrected images.

11. The imaging system according to claim 1, wherein said controller causes the imaging device to sequentially image the blocks in the imaging area while changing a relative position between the subject and the imaging device.

12. The imaging system according to claim 1, further comprising a single imaging optical system that forms images of the plurality of blocks in the imaging area of the subject.

13. An imaging method comprising the steps of:
performing a plurality of imaging operations and storing image data in a storage device, each imaging operation capturing a respective partial image of a respective corresponding block in an imaging area of a subject, each imaging operation being performed using an imaging device;
merging the plurality of partial images to generate an entire image of the imaging area of the subject; and
setting boundaries between the blocks at positions such as to minimize variations of measured data in the entire image, out of a plurality of positions on the subject,
wherein said steps are performed using a CPU.

14. The imaging method according to claim 13, wherein
the measured data includes information on a brightness of the subject, and
the boundaries between the blocks are set at positions to minimize variations in brightness of the subject.

15. The imaging method according to claim 13, wherein
the measured data includes information on a color of the subject, and
the boundaries between the blocks are set at positions to minimize variations in color of the subject.

16. The imaging method according to claim 13, wherein
the measured data includes information on a height of a surface of the subject in an optical axis direction or information on a height of a surface of a protective member in an optical axis direction provided over the subject, and
the boundaries between the blocks are set at positions to minimize variations in the height of the surface of the subject or the surface of the protective member.

17. The imaging method according to claim 13, wherein the boundaries between the blocks are adjusted by translating the boundaries between the blocks in a plane perpendicular to an optical axis.

18. The imaging method according to claim 13, wherein the boundaries between the blocks are adjusted by rotating the boundaries between the blocks in a plane perpendicular to an optical axis.

19. The imaging method according to claim 13, further comprising the step of obtaining an observed range in which the subject exists based on the measured data, and determining the imaging area so as to contain the observed range.

20. The imaging method according to claim 13, wherein said step of setting the boundaries between the blocks includes the steps of:
calculating a feature corresponding to variation of measured data for each of a plurality of points on the subject;
calculating an evaluation amount based on the features of the plurality of points located on or in a vicinity of the boundaries between the blocks;
calculating the evaluation amount at each position while varying positions of the boundaries between the blocks; and
setting the boundaries between the blocks at a position to minimize the evaluation amount.

21. An imaging system comprising:
an imaging device that captures a plurality of partial images corresponding to a plurality of blocks in an imaging area of a subject that is arranged on a slide by using a plurality of image sensors, respectively, and stores image data in a storage device;
an image processing device that merges the plurality of partial images to generate an entire image of the imaging area of the subject;
a measuring device that measures a plurality of positions on the subject to acquire measured data; and
a controller that sets boundaries between the blocks at positions to minimize spatial variations of the measured data out of the plurality of positions on the subject.

* * * * *